Feb. 20, 1951    C. T. TORRESEN    2,542,375
NUT STRUCTURE
Filed June 21, 1944

INVENTOR.
Carel T. Torresen.

Patented Feb. 20, 1951

2,542,375

UNITED STATES PATENT OFFICE 2,542,375

NUT STRUCTURE

Carel T. Torresen, Santa Monica, Calif.

Application June 21, 1944, Serial No. 541,394

9 Claims. (Cl. 85—32)

The invention relates to an improvement in fastening means with particular reference to nut holders, currently known as nut anchors or gang nut channels, used in conjunction with screws or bolts for fastening parts together in aircraft. The invention is particularly adaptable to attaching sheets of metal or the like to structures, in which the nut may be concealed, or in structures where the nut may be in full view, but for reason of inaccessibility, or mayhap for the sake of convenience, it may prove desirable to have the nut retained in place after removal of the screw or bolt.

Various types of fastening means have been employed in retaining nuts in place, among which channel-like retainers are the more common. Channels or other restraining devices employed in the past have usually provided no ready method of installing or replacing the nut without destructive forces applied to the channel or retainer.

Frequently during the operation of removing the screw, because of damage to the nut or breakage of the screw in the nut, replacement of the nut is preferred to that of drilling out the broken screw and subsequently retapping the nut.

The types of retainers requiring side wall flexure for the removal of nuts are not strongly in favor, because of the probability of nut rotation induced by screw torque. Types of retainers having loose pieces which may become lost are also objectionable. This is particularly true of the type of nut retainer where loss of separable parts among flight controls would be serious.

The improvement in this invention consists of providing a simple, rigid one piece nut retainer with a means for permitting ready emplacement or removal of the nut, without destruction or permanent distortion of the retainer.

The ensuing description and accompanying drawing will convey further understanding of purposes and advantages of this invention.

Figures 1, 2:
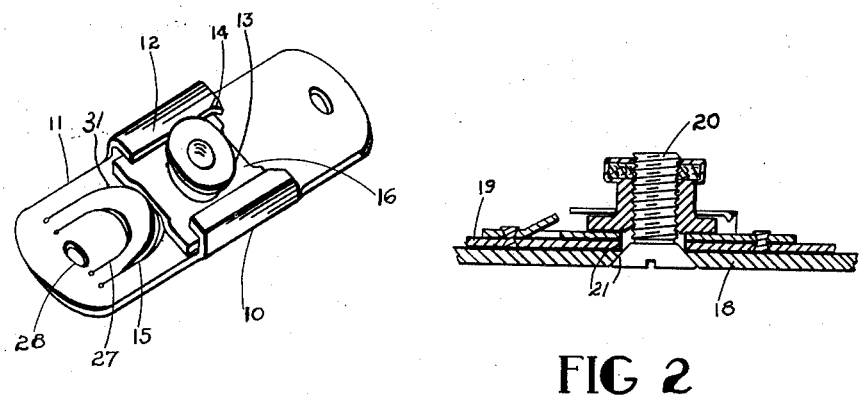
Figure 1 is a perspective view of the retainer as a single unit and containing a conventional nut.
Figure 2 is a cross-sectional assembly view of a single retainer riveted to a structure together with attaching plate, screw and nut.

Referring to Figure 1, the retainer 10 is made up of a base or web section 11 incorporating attaching rivet holes 28 and having up and in turned flanges 12 located approximately in the center of the unit length. The flanges 12 permit of free but limited side play of nut 13. The nut structure or retainer also provides a free but limited end play of nut 13.

Figures 5, 6:
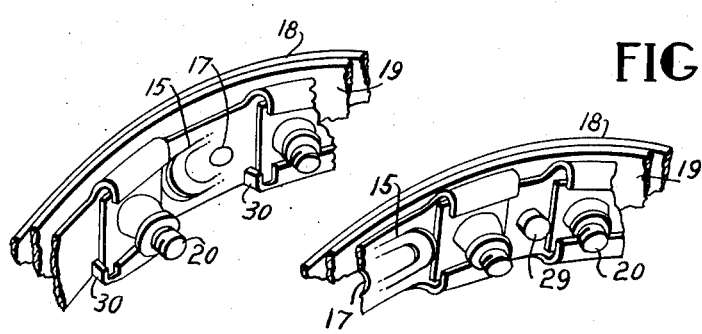
Figure 5 is a view similar to Figure 3 showing a nut strip attached to a curved interior structure and illustrating a modified type of fixed stop.
Figure 6 is a view similar to Figure 5 and illustrating a still further modified type of fixed stop.

Fixed stop 14 formed on one or both flanges is provided to limit endwise movement of nut in one direction. To those skilled in the art it is obvious that fixed stop 14 may be one of a number of forms, such for example as an ear 30 projecting inwardly from a side wall of a flange as shown in Figure 5, or by means of a projecting rivet head 29 as shown in Fig. 6, either or both of which may be spaced in near proximity to one side of the nut base. Travel endwise in the opposite direction is prevented by a curvilinear upturned spring stop 15 formed of the material of the channel web, surface 27 being a continuation of the web surface 11 and outlining the inner curvature of the spring stop 15. In like manner the slit 31 in the web surface 11 may define the outline of the outer curvature of the spring stop 15. The free end of the spring stop 15 is so located with respect to the nut that while providing for a limited movement of the nut endwise in the channel this endplay is insufficient to cause the nut to be misaligned with the clearance bolt hole in the channel more than a predetermined amount.

Stop 15 may be provided at either end of retainer eliminating fixed stop 14 for convenience in ejecting nut in either direction.

Figure 4:
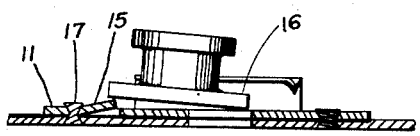
Figure 4 is a cross-sectional view of the retainer unit riveted to a structural member and illustrating a nut in process of being installed or removed.

Assembly of the nut in the retainer is readily accomplished by entering nut base flange 16 into the channel entrance as shown in Figure 4, compressing spring stop 15 down into the recess formed in the web 11 during the operation of slitting the web to fabricate stop 15, forcing the nut home in the channel, after which the stop 15, when restored to free height, will retain nut in place.

Ejection of the nut likewise is readily accomplished. Depressing spring stop 15 approximately level with web 11 by application of some convenient tool will permit the sliding of the nut out of channel over the deflected spring stop. Egress is further facilitated by having retainer attaching rivet 17, Figure 4, approximately flush with upper surface of web 11. This may be accomplished by countersinking hole 28 for the rivet.

In Figure 2, cover plate 18 is attached to structure 19 with screw 20. Plate 18, however, may be misaligned a permissible amount. This would cause difficulty in assembling the screw 20 unless holes 21 were oversize. However, the nut must be in alignment with the attaching plate 18 to prevent cross threading of screw and nut.

A limited floating multilateral movement in the plane of the nut base is therefore provided for the nut in the retainer. In attachment of members to structures in which misalignment of holes is small, the floating movement of the nut can of course be correspondingly reduced.

Figure 3:
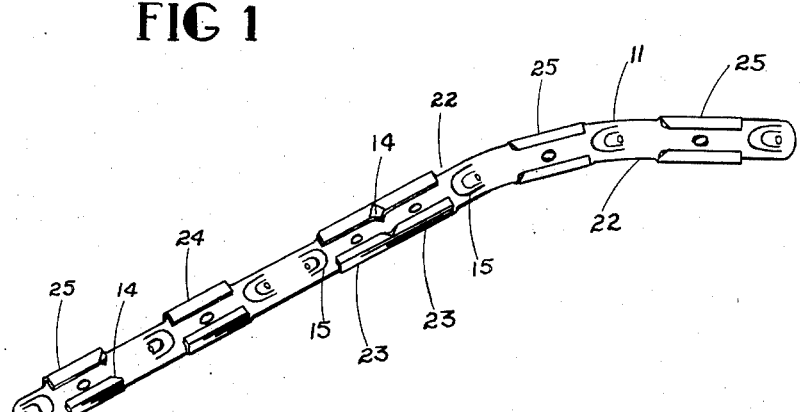
Figure 3 illustrates the nut structure or retainer as a continuous member adaptable to contain a plurality of nuts.

In Figure 3, as in Figure 1, the retainer is channel in form only at the nut location, the flanges being cut away between the nut locations to leave a strip between the nut stations, or at the ends. The cut away portions 22 provide a number of advantages. The web 11 may be flexed easily. Forming laterally in the plane of the web or a combination of bending and twisting may also be given to the web by suitable equipment in order to cause the strip to conform to attaching structure, as illustrated in Fig. 5.

The primary purpose of omitting the flanges between nut stations is to provide for ingress and egress of the nut.

Ordinarily, an objective in aircraft design is to space the nuts evenly. Practical application of the multiple nut retainer however justifies a miscellany of nut spacing.

A variety of such arrangements for a multiple nut assembly is shown in Figure 3. At 23 two nut positions are contiguous, fixed stops being located centrally between them and with the spring stops provided at each end of the flanges. At position 24 the spring stops are provided at each end of the nut position as another alternative arrangement. Position 25 partakes of the design incorporated in the single unit shown in Figure 1.

The material employed in the manufacture of the nut retainer may be any of the materials capable of attaining spring like qualities in fabrication, but of relative strength such as spring steel, hardenable aluminum alloys and some of the plastic materials.

Having described my improvements in a nut retainer, I claim:

1. A nut structure comprising a nut having an outwardly shouldered base of shape other than round assembled in a channel having a web and side flanges turned upwardly and inwardly over said nut base for the prevention of but slight axial nut movement, said flanges being of length shorter than that of the web but approximate that of said nut base, a positive stop at one end of said flanges and a spring-like prong formed of said channel web projecting upward with its free end toward said nut a distance above said web top surface sufficient for the retention of said nut and adaptable for the passage of said nut when flexed downward, said prong positioned between and substantially at the opposite end of said flanges, said stop, flanges and prong arranged to permit a limited rotational and multilateral movement of said nut.

2. A nut holding means comprising: a channel member having a web section of predetermined length and a flange extending upwardly and inwardly from each side edge of said web section; said flanges being of substantially equal length and substantially shorter than said web section; and stop means located substantially at each end of said flanges to prevent passage of a nut thru either of said ends; at least one of said stop means comprising a resilient tongue formed of the material of said web section with its free end extending above the plane of said web section; the free length of said tongue being substantially greater than the width of its juncture with said web section whereby it may flex readily and return to its original position; said tongue being axially spaced from said flanges.

3. A nut holding means as claimed in claim 2 in which said tongue extends axially of said web section and its upwardly displaced free end is adjacent to the ends of said flanges.

4. A nut holding means as claimed in claim 2 in which said tongue is substantially U-shaped, the base of the U constitutes the free end of the tongue, and the ends of the U are integrally joined to the web section.

5. A nut holding means as claimed in claim 2 in which each of said stop means comprises a resilient tongue formed of the material of said web section with its free end extending above the plane of said web section; the free length of each tongue being substantially greater than the width of its juncture with said web section; and each of said tongues being axially spaced from said flanges.

6. A nut holding means as claimed in claim 2 in which said other stop means comprises an integral inwardly extending portion of at least one of said flanges.

7. A multiple nut holding means comprising: a web strip of substantial length; a series of spaced flanges extending upwardly and inwardly from each side edge of said strip; each pair of flanges forming a channel for the reception of at least one anchor nut; the spaces between successive pairs of flanges being of substantial length to provide for lateral ingress and egress of anchor nuts; and stop means located substantially at each end of each of said channels to prevent free passage of an anchor nut from either end of any such channel; at least one of said stop means comprising a resilient tongue formed of the material of said web strip with its free end extending above the plane of said strip.

8. A nut holding means as claimed in claim 7 in which one of said stop means comprises a portion of one of said flanges extending within the mouth of its respective channel.

9. A nut structure comprising: a web strip; at least one flange extending upwardly and inwardly from each side edge of said strip to form a channel; said flanges being shorter than said strip; a nut having a generally rectangular shouldered base located in said channel; the internal dimensions of said channel being slightly greater than the external dimensions of said shouldered base to provide limited universal movement of said nut; a fixed stop at one end of said channel to prevent ingress or egress of a nut from said end; and a movable stop at the other end of said channel to selectively permit or prevent ingress or egress of a nut from said other end; said movable stop comprising a resilient tongue formed of the material of said strip with its free end extending above the plane of said web section; the free length of said tongue being substantially greater than the width of its juncture with said strip whereby it may flex readily and return to its original position; the abutment surfaces of said stops being spaced axially of said strip a distance slightly greater than the corresponding dimension of said shouldered base to provide for limited movement of said nut axially of said strip.

CAREL T. TORRESEN.

REFERENCES CITED

The following references are of record in the file of this patent:

UNITED STATES PATENTS

| Number | Name | Date |
|---|---|---|
| 240,032 | Limbright | Apr. 12, 1881 |
| 462,914 | Pilkington | Nov. 10, 1891 |
| 925,524 | Steinmetz | June 22, 1909 |
| 1,931,011 | Richardson et al. | Oct. 17, 1933 |
| 2,144,350 | Swanstrom | Jan. 17, 1939 |
| 2,144,553 | Simmonds | Jan. 17, 1939 |
| 2,249,923 | Whitcombe | July 22, 1941 |
| 2,299,158 | Luce | Oct. 20, 1942 |
| 2,333,386 | Murphy | Nov. 2, 1943 |
| 2,358,890 | Tinnerman | Sept. 26, 1944 |
| 2,413,669 | Whitcombe | Dec. 31, 1946 |

FOREIGN PATENTS

| Number | Country | Date |
|---|---|---|
| 2,447 | Great Britain | Jan. 30, 1913 |